United States Patent
Huang

(10) Patent No.: US 9,310,558 B2
(45) Date of Patent: Apr. 12, 2016

(54) OPTICAL PRINTED CIRCUIT BOARD WITH TWO LIGHT WAVEGUIDE LAYERS OPTICALLY COUPLED TO EACH OTHER

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 408 days.

(21) Appl. No.: 13/757,862

(22) Filed: Feb. 4, 2013

(65) Prior Publication Data

US 2013/0315536 A1    Nov. 28, 2013

(30) Foreign Application Priority Data

May 28, 2012  (TW) ................................. 101118891

(51) Int. Cl.
*G02B 6/26* (2006.01)
*G02B 6/12* (2006.01)
*G02B 6/122* (2006.01)

(52) U.S. Cl.
CPC ............... *G02B 6/26* (2013.01); *G02B 6/12002* (2013.01); *G02B 6/1228* (2013.01)

(58) Field of Classification Search
None
See application file for complete search history.

(56) References Cited

U.S. PATENT DOCUMENTS

| | | | | |
|---|---|---|---|---|
| 5,568,579 A | * | 10/1996 | Okaniwa ................ | G02B 6/305 385/29 |
| 7,565,046 B2 | * | 7/2009 | Feng et al. ...................... | 385/28 |
| 8,285,092 B2 | * | 10/2012 | Deki et al. ...................... | 385/28 |
| 2003/0081902 A1 | * | 5/2003 | Blauvelt et al. ................. | 385/50 |
| 2008/0069498 A1 | * | 3/2008 | Frolov ............................ | 385/43 |
| 2009/0297093 A1 | * | 12/2009 | Webster et al. ................. | 385/14 |
| 2010/0165352 A1 | * | 7/2010 | Frolov ........................... | 356/477 |
| 2011/0170819 A1 | * | 7/2011 | Zheng et al. ..................... | 385/2 |
| 2012/0224813 A1 | * | 9/2012 | Chen et al. ....................... | 385/43 |

* cited by examiner

*Primary Examiner* — Sung Pak
(74) *Attorney, Agent, or Firm* — Novak Druce Connolly Bove + Quigg LLP

(57) ABSTRACT

An optical PCB includes a substrate layer, a first light waveguide layer and a second light waveguide layer. The first light waveguide layer and the second light waveguide layer are positioned on the substrate layer and are optically coupled with each other. The first light waveguide layer includes a first tapered end facing toward the second light waveguide layer, and the second light waveguide layer includes a second taped end facing toward the first light waveguide layer. The first light waveguide layer and the second light waveguide layer are optically coupled with each other via the first tapered end and the second tapered end.

13 Claims, 5 Drawing Sheets

OPTICAL PRINTED CIRCUIT BOARD WITH TWO LIGHT WAVEGUIDE LAYERS OPTICALLY COUPLED TO EACH OTHER

BACKGROUND

1. Technical Field

The present disclosure relates to an optical printed circuit board (PCB).

2. Description of Related Art

An optical PCB is a PCB that can transmit information via optical signals instead of electrical signals. The optical PCB typically employs light waveguides to transmit optical signals. Optical signals are transmitted between two different light waveguides by a prism coupler or a grating coupler. However, an optical coupling efficiency of the prism coupler mainly depends on an assembling precision, which is often less than satisfactory. The grating coupler has a low optical coupling efficiency, usually about 10%-30%, which also fails to meet requirements of high-speed communication.

What is needed therefore is an optical PCB addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
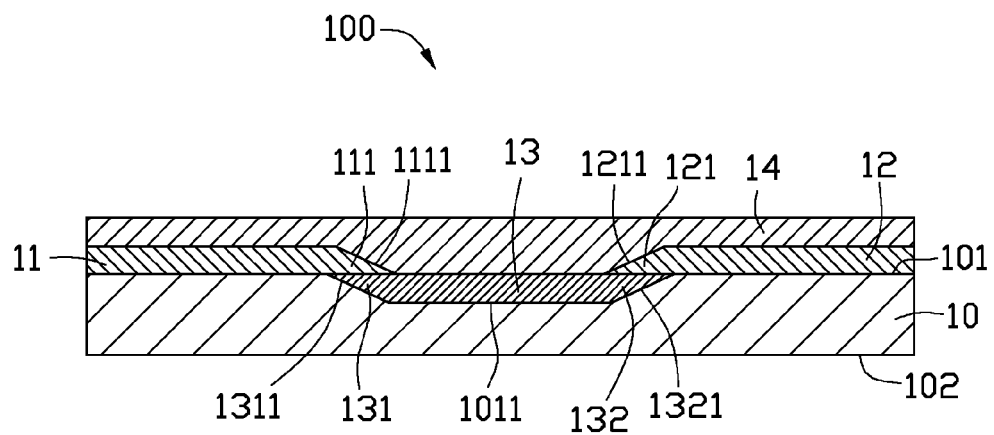
FIG. 1 is a schematic view of an optical PCB, according to a first exemplary embodiment of the present disclosure.

FIG. 1 shows an optical PCB 100 according to a first exemplary embodiment. The optical PCB 100 includes a substrate layer 10, a first light waveguide layer 11, a second light waveguide layers 12, and an interconnecting light waveguide layer 13 between the first and second waveguide layers 11, 12. The first light waveguide layer 11 and the second light waveguide layer 12 are optically coupled with each other by the interconnecting light waveguide layer 13.

The substrate layer 10 includes a first surface 101 and an opposite second surface 102 and defines a receiving groove 1011 in the first surface 101 for receiving the interconnecting light waveguide layer 13. The substrate layer 10 may include printed circuits (not shown) formed on the first surface 101, the second surface or in the substrate layer 10.

The first and second light waveguide layers 11, 12 are positioned on the first surface 101. The first light waveguide layer 11 includes a first tapered end 111, and the second light waveguide layer 12 includes a second tapered end 121. The first taper end 111 and the second taper end 111 are opposite to each other. The first tapered end 111 is tapered along a direction toward the second light waveguide layer 12. The second tapered end 121 is tapered along a direction toward the first waveguide layer 11. The first tapered end 111 includes a first inclined surface 1111, and the second tapered end includes a second inclined surface 1211.

The interconnecting waveguide layer 13 is received in the receiving groove 1011. The interconnecting waveguide layer 13 includes a third tapered end 131 and an opposite fourth tapered end 132. The third tapered end 131 faces toward the first waveguide layer 11 and is tapered along a direction toward the first waveguide layer 11. The fourth tapered end 132 faces toward the second waveguide layer 12 and is tapered along a direction toward the second waveguide layer 12. The third tapered end 131 includes a third inclined surface 1311 substantially parallel to the first inclined surface 1111, and the fourth tapered end 132 includes a fourth inclined surface 1321 substantially parallel to the second inclined surface 1211.

The first tapered end 111 overlaps the third tapered 131, and the second tapered end 121 overlaps the fourth tapered end 132. In this embodiment, an orthogonal projection of the first tapered end 111 on the first surface 101 substantially coincides with an orthogonal projection of the third tapered end 131 on the first surface 101, and an orthogonal projection of the second tapered end 121 on the first surface 101 substantially coincides with an orthogonal projection of the fourth tapered end 131 on the first surface 101.

In this embodiment, the first light waveguide layer 11, the second light waveguide layer 12 and the interconnecting waveguide layer 13 are selected from a type of planar light waveguide, strip light waveguide and fiber light waveguide.

The optical PCB 10 further includes a reflecting layer 14 covering the first light waveguide layer 11, the second light waveguide layer 12 and the interconnecting waveguide layer 13. The reflecting layer 14 is made from a material of high reflectivity, such as silver, aluminum, or copper, for example.

In this embodiment, optical signals are transferred between the first optical wave guider layer 11 and the second waveguide layer 12 by the interconnecting light waveguide layer 13. In detail, optical signals transmit through the first light waveguide layer 11 to the first tapered end 111, then the optical signal is reflected to the third taper end 131 by the first inclined surface 1111. The optical signal is further reflected by the third inclined surface 1311 and transmitted through the interconnecting light waveguide layer 13 from the third tapered end 131 to the fourth end 132. Then the optical signal is reflected to the second tapered end 121 by the fourth inclined surface 1411. The optical signal is reflected by the second inclined surface 1211 and transmitted through the second light waveguide layer 12. The reflecting layer 14 can reduce the loss of the optical signals at the first inclined surface 1111 and the second inclined surface 1211. Optical signals can also be transmitted along a converse direction in the optical PCB 100.

Figure 2:
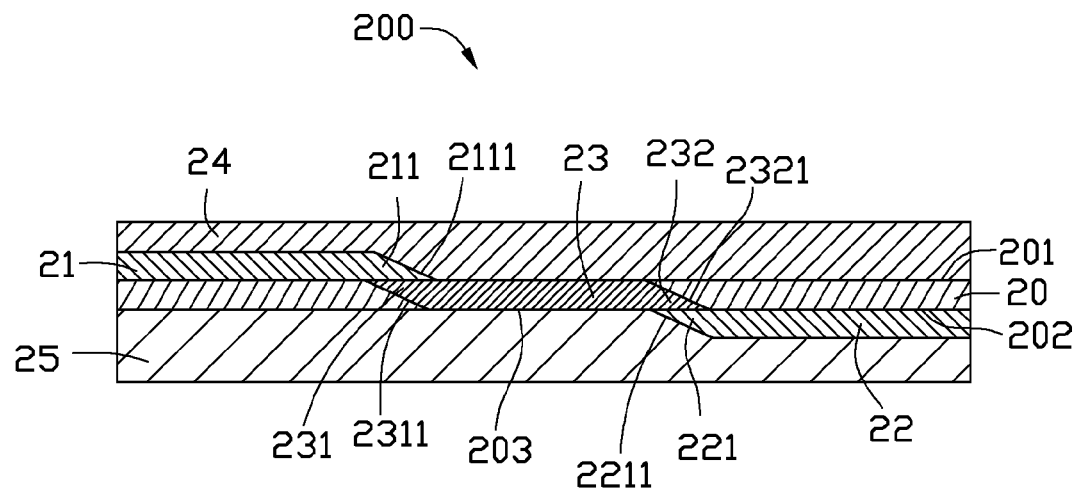
FIG. 2 is a schematic view of an optical PCB, according to a second exemplary embodiment of the present disclosure.

FIG. 2 shows an optical PCB 200 according to a second exemplary embodiment. Similar to the first embodiment, the optical PCB 200 includes a substrate layer 20, a first light waveguide layer 21, a second light waveguide layer 22 and an interconnecting light waveguide layer 23. The substrate layer 20 includes a first surface 201 and an opposite second surface 202. The substrate layer 20 defines a receiving groove 203 for receiving the interconnecting light waveguide layer 23 therein. The first light waveguide layer 21 includes a first tapered end 211, and the first tapered end 211 includes a first inclined surface 2111. The second light waveguide layer 22 includes a second tapered end 221, including a second inclined surface 2211. The interconnecting light waveguide layer 23 includes a third tapered end 231 and an opposite fourth tapered end 232, the third taper end 231 includes a third inclined surface 2311, and the fourth tapered end 232 includes a fourth inclined end 2321. Different from the first embodiment, a thickness of the interconnecting light waveguide layer 23 is substantial equal to that of the substrate layer 20. In addition, the receiving groove 203 passes through the first surface 21 and the second surface 22. The first light waveguide layer 21 is positioned on the first surface 201, and the second light waveguide layer 22 is positioned on the second surface 202.

The optical PCB 200 further includes a first reflecting layer 24 covering the first light waveguide layer 21 and a second reflecting layer 25 covering the second light waveguide layer 22. The first reflecting layer 24 and the second reflecting layer 25 are made of materials with high reflectivity.

Figure 3:
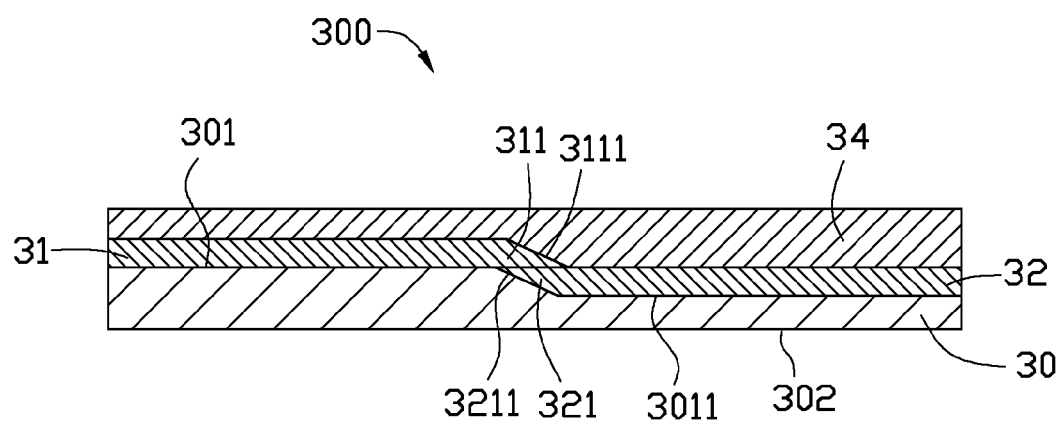
FIG. 3 is a schematic view of an optical PCB, according to a third exemplary embodiment of the present disclosure.

FIG. 3 shows an optical PCB 300 according to a third exemplary embodiment. Similar to the first embodiment, the optical PCB 300 includes a substrate layer 30, a first light waveguide layer 31, and a second light waveguide layer 32. The substrate layer 30 includes a first surface 301 and an opposite second surface 302. The first light waveguide layer 31 includes a first tapered end 311, and the first tapered end 311 includes a first inclined surface 3111. The second light waveguide layer 32 includes a second tapered end 321, and the second tapered end 321 includes a second inclined surface 3211. The first inclined surface 3111 is substantially parallel to the second inclined surface 3211. Different from the first embodiment, the substrate layer 30 defines a receiving groove 303 in the first surface 301 for receiving the second light waveguide layer 32 therein. The first tapered end 311 overlaps and touches the second tapered end 321. In this embodiment, an orthogonal projection of the first tapered end 311 on the first surface 301 substantially coincides with an orthogonal projection of the second tapered end 321 on the first surface 301. Thus, an interconnecting light waveguide layer can be omitted, in this embodiment.

The optical PCB 300 further includes a reflecting layer 34 covering the first and second light waveguide layers 31, 32.

Figure 4:
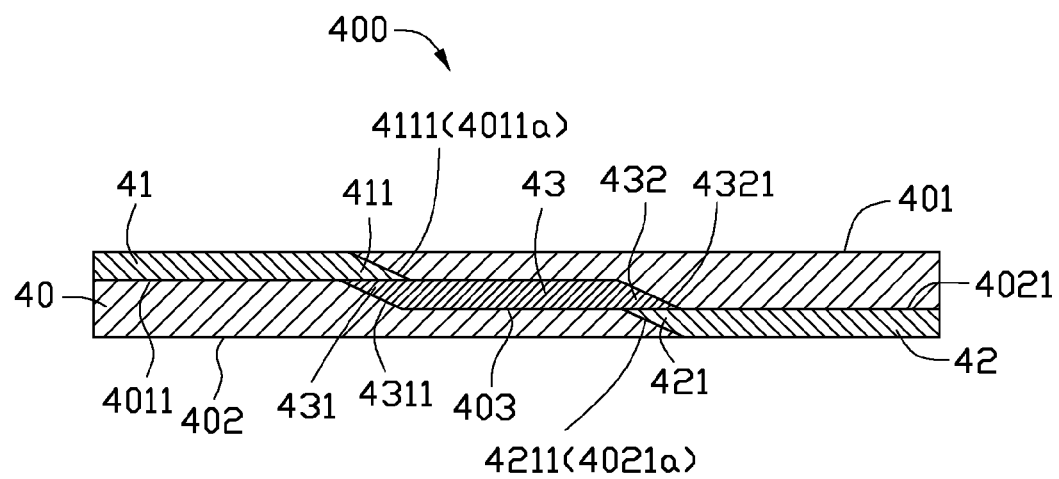
FIG. 4 is a schematic view of an optical PCB, according to a fourth exemplary embodiment of the present disclosure.

FIG. 4 shows an optical PCB 400 according to a fourth exemplary embodiment. Similar to the second embodiment, the optical PCB 400 includes a substrate layer 40, a first light waveguide layer 41, a second light waveguide layer 42, and an interconnecting light waveguide layer 43. The substrate layer 40 includes a first surface 401 and an opposite second surface 402. The first light waveguide layer 41 includes a first tapered end 411, including a first inclined surface 4111. The second light waveguide layer 42 includes a second tapered end 421, including a second inclined surface 4211. The interconnecting light waveguide layer 43 includes a third tapered end 431 and an opposite fourth tapered end 432. The third taper end 431 includes a third inclined surface 4311, and the fourth tapered end 432 includes a fourth inclined end 4321. Different from the second embodiment, the substrate layer 40 defines a first receiving groove 4011 in the first surface 401, a second receiving groove 4021 in the second surface 402 and a third receiving groove 403 communication with the first receiving groove 4011 and the second receiving groove 4021. The first receiving groove 4011 includes a first tapered portion 4011a corresponding to the first taper end 411, and the second receiving groove 4021 includes a second tapered portion 4021a corresponding to the second tapered end 421. The first light waveguide layer 41 is received in the first receiving groove 4011, and the first tapered end 411 is engaged into the first tapered portion 4011a. The second light waveguide layer 42 is received in the second receiving groove 4021, and the second tapered end 421 is engaged into the second tapered portion 4021a. The third receiving groove 403 is defined in a side surface of the substrate layer 40 substantially perpendicular to the first and second surface 401, 402, and the interconnecting light waveguide layer 43 is engaged into the third receiving groove 403 from the side surface of the substrate layer 40. In this embodiment, a first reflecting layer and a second reflecting layer can be omitted, therefore, the optical PCB 400 has a simple structure and low cost.

Figure 5:
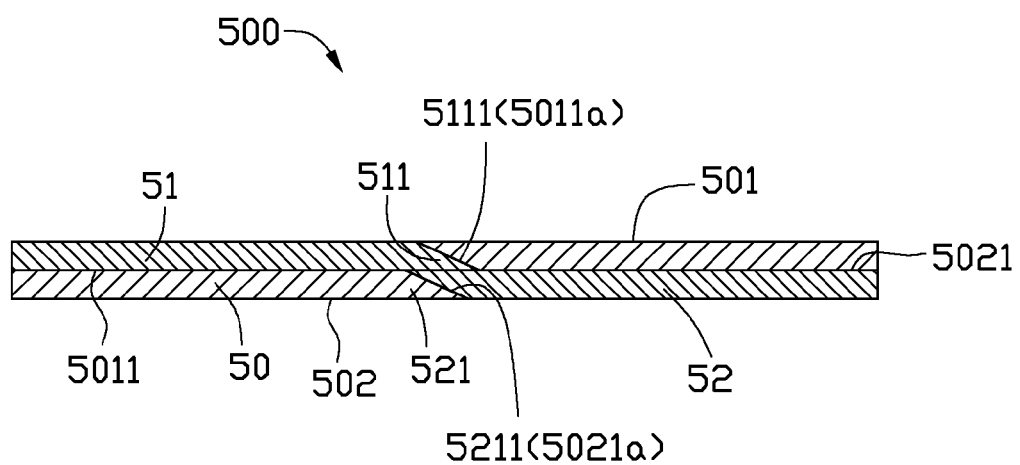
FIG. 5 is a schematic view of an optical PCB, according to a fifth exemplary embodiment of the present disclosure.

FIG. 5 shows an optical PCB 500 according to a fifth exemplary embodiment. Similar to the fourth embodiment, the optical PCB 500 includes a substrate layer 50, a first light waveguide layer 51, and a second light waveguide layer 52. The substrate layer 50 includes a first surface 501 and an opposite second surface 502. The first light waveguide layer 51 includes a first tapered end 511, and the first tapered end 511 includes a first inclined surface 5111. The second light waveguide layer 52 includes a second tapered end 521, and the second tapered end 521 includes a second inclined surface 5211. The substrate layer 50 defines a first receiving groove 5011 with a first tapered portion 5011a in the first surface 501 and a second receiving groove 5021 with a second tapered portion 5021a in the second surface 502. The first and second receiving grooves 5011, 5021 are communicated with each other. The first light waveguide layer 51 is received in the first receiving groove 5011, and the first tapered end 511 is engaged into the first tapered potion 5011a. The second light waveguide layer 52 is received in the second receiving groove 5021, and the second tapered end 521 is engaged into the second tapered portion 5021a. The first inclined surface 5111 is substantially parallel to the second inclined surface 5211. Different from the fourth embodiment, the first tapered end 511 overlaps and touches the second tapered end 521. In this embodiment, an orthogonal projection of the first tapered end 511 on the first surface 501 substantially coincides with that of the second tapered end 521. Thus, an interconnecting waveguide layer can be omitted, in this embodiment.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical printed circuit board (PCB), comprising:
   a substrate layer defining a receiving groove;
   a first light waveguide layer on the substrate layer;
   a second light waveguide layer on the substrate layer, the second light waveguide layer being optically coupled with the first light waveguide layer; and
   an interconnecting light waveguide layer received in the receiving groove of the substrate layer and positioned between the first light waveguide layer and the second light waveguide layer, the first light waveguide layer optically coupled with the second light waveguide layer via the interconnecting light waveguide layer;
   wherein the first light waveguide layer comprises a first tapered end facing toward the second light waveguide layer, the second light waveguide layer comprises a second tapered end facing toward the first light waveguide layer, and the first light waveguide layer and the second light waveguide layer are optically coupled with each other via the first tapered end and the second tapered end.

2. The optical PCB of claim 1, wherein the interconnecting light waveguide layer comprises a third tapered end and a fourth tapered end opposite to the third tapered end, the first tapered end overlaps the third tapered end, the second tapered end overlaps the fourth tapered end, a bottom surface of the first tapered end contacts a surface of the interconnecting light waveguide layer, and a bottom surface of the second tapered end contacts a surface of the interconnecting light waveguide layer.

3. The optical PCB of claim 2, wherein the first tapered end comprises a first inclined surface connecting the bottom surface of the first tapered end, the second tapered end comprises a second inclined surface connecting the bottom surface of the second tapered end, the third tapered end comprises a third inclined surface, the fourth tapered end comprises a fourth inclined surface, the first inclined surface is optically coupled with the third inclined surface, and the second inclined surface is optically coupled with the fourth inclined surface.

4. The optical PCB of claim 3, wherein the first inclined surface is substantially parallel to the first inclined surface, and the fourth inclined surface is substantially parallel to the second inclined surface.

5. The optical PCB of claim 4, wherein the substrate layer comprises a first surface and a second surface opposite to the first surface, the receiving groove is defined in the first surface, and the bottom surface of the first light waveguide layer and the bottom surface of the second light waveguide layer are positioned on the first surface.

6. The optical PCB of claim 5, wherein the optical PCB further comprises a reflecting layer covering the first light waveguide layer, the second light waveguide layer, and the interconnecting waveguide layer.

7. The optical PCB of claim 5, wherein an orthogonal projection of the third tapered end on the first surface substantially coincides with an orthogonal projection of the first tapered end on the first surface, and an orthogonal projection of the fourth tapered end on the first surface substantially coincides with an orthogonal projection of the second tapered end on the first surface.

8. The optical PCB of claim 4, wherein the substrate layer comprises a first surface and a second surface opposite to the first surface, the receiving groove of the substrate layer passes through the substrate layer, the bottom surface of the first light waveguide layer is positioned on the first surface, and the bottom surface of the second light waveguide layer is positioned on the second surface.

9. The optical PCB of claim 8, wherein the optical PCB further comprises a first reflecting layer and a second reflecting layer, the first reflecting layer covers the first light waveguide layer and the first surface, and the second reflecting layer covers the second light waveguide layer and the second surface.

10. The optical PCB of claim 9, wherein the first reflecting layer and the second reflecting layer are made of materials with high reflectivity.

11. The optical PCB of claim 4, wherein a thickness of the interconnecting light waveguide layer is substantial equal to that of the substrate layer.

12. The optical PCB of claim 4, wherein the substrate layer comprises a first surface and a second surface opposite to the first surface, the substrate layer defines a first receiving groove in the first surface, a second receiving groove in the second surface and the receiving groove communication with the first receiving groove and the second receiving groove, the receiving groove is defined in a side surface of the substrate layer substantially perpendicular to the first surface and the second surface, the first light waveguide layer is received in first receiving groove, the second light waveguide layer is received in the second receiving groove, and the interconnecting light waveguide layer is engaged into the receiving groove from the side surface of the substrate layer.

13. The optical PCB of claim 12, wherein the first receiving groove comprises a first tapered portion corresponding to the first tapered end, the second receiving groove comprises a second tapered portion corresponding to the second tapered portion, the first tapered end is engaged into the first tapered portion, and the second tapered end is engaged into the second tapered portion.

\* \* \* \* \*